United States Patent
Allsop

(10) Patent No.: US 7,438,367 B2
(45) Date of Patent: Oct. 21, 2008

(54) HUB CAP HAVING AN AIR VALVE FOR BEARING CAVITY PRESSURIZATION

(76) Inventor: M. Sid Allsop, 81 W. Westview Dr., Orem, UT (US) 84058

( * ) Notice: Subject to any disclaimer, the term of this patent is extended or adjusted under 35 U.S.C. 154(b) by 82 days.

(21) Appl. No.: 11/430,475

(22) Filed: May 8, 2006

(65) Prior Publication Data

US 2006/0208560 A1  Sep. 21, 2006

Related U.S. Application Data

(63) Continuation-in-part of application No. 10/366,969, filed on Feb. 13, 2003, now abandoned.

(51) Int. Cl.
 B60B 27/00 (2006.01)
 B61F 15/26 (2006.01)
(52) U.S. Cl. .................... 301/108.1; 384/190.6
(58) Field of Classification Search ............. 301/105.1, 301/108.1–108.5; 384/189, 190.6, 190.7, 384/448–449; 277/637, 641–642
 See application file for complete search history.

(56) References Cited

U.S. PATENT DOCUMENTS

| | | | |
|---|---|---|---|
| 2,112,615 A * | 3/1938 | Zerk .................... 301/35.59 |
| 3,064,982 A * | 11/1962 | Stephens .................... 277/402 |
| 3,077,948 A | 2/1963 | Law |
| 3,149,845 A * | 9/1964 | Knox .................... 277/641 |
| 3,149,883 A | 9/1964 | Reilly |
| 3,169,809 A * | 2/1965 | Pendleton .................... 277/402 |
| 3,226,162 A | 12/1965 | Eberle |
| 3,316,022 A * | 4/1967 | Isenbarger ............... 301/108.2 |
| 3,393,015 A * | 7/1968 | Kaufman ................. 301/108.1 |
| 3,460,874 A * | 8/1969 | Johnson ...................... 384/489 |
| 3,649,080 A * | 3/1972 | Molinare ................. 301/108.1 |
| 3,785,706 A | 1/1974 | Vangalis |
| 3,955,852 A | 5/1976 | De Puydt et al. |
| 4,106,816 A | 8/1978 | August |
| 4,223,951 A * | 9/1980 | Muramatsu et al. ...... 301/37.36 |
| 5,104,202 A * | 4/1992 | Branch .................... 301/108.1 |
| 5,505,525 A * | 4/1996 | Denton .................... 301/108.4 |
| 5,897,172 A * | 4/1999 | Jarrell .................... 301/108.1 |
| 2004/0160115 A1* | 8/2004 | Allsop .................... 301/108.1 |

* cited by examiner

Primary Examiner—Jason R Bellinger

(57) ABSTRACT

A hub cap is provided for boat trailer wheel hubs that includes an air valve. The valve may take several different forms. A hub cap employs a security air valve that is inserted through an aperture formed within the hub cap body. The valved hub cap allows the hub cavity to be temporarily pressurized when a boat trailer is partially submerged during the launch and recovery of a boat. Additional features may be incorporated in the hub cap, including a pressure release valve, which prevents damage to the hub seal, an O-ring groove in the hub cap body, which seals the cap to the hub and may also secure the hub cap to the wheel hub body. A separate spring retainer clip is also provided, which secures the hub cap to the hub body.

3 Claims, 4 Drawing Sheets

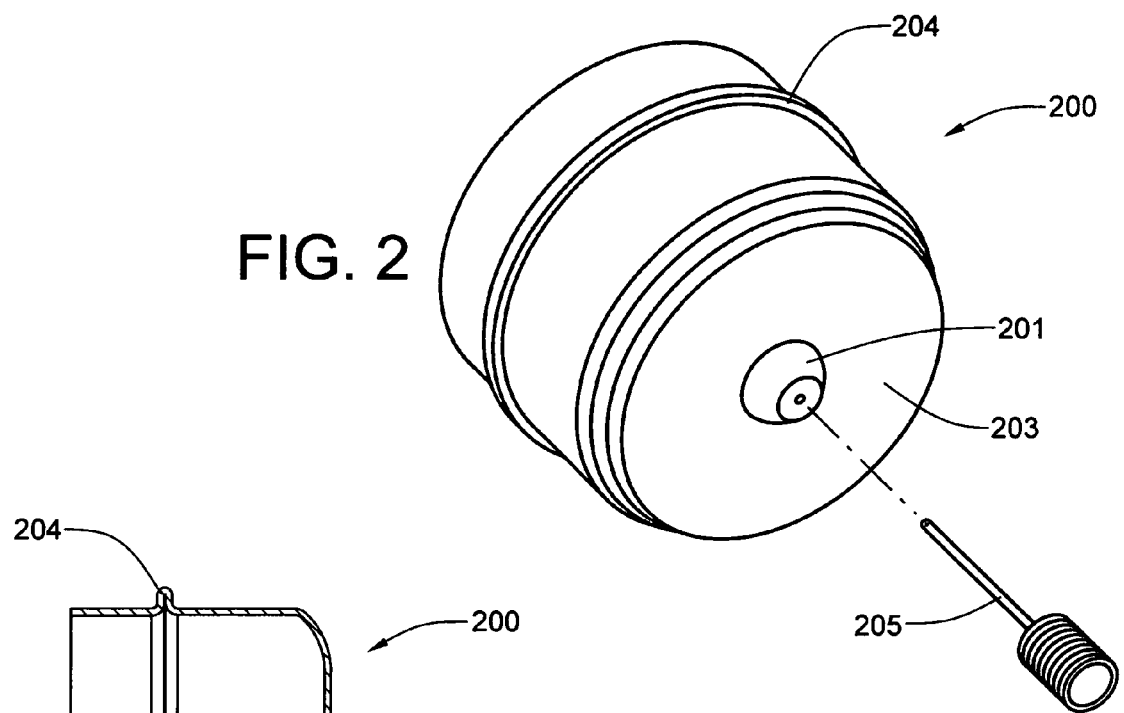
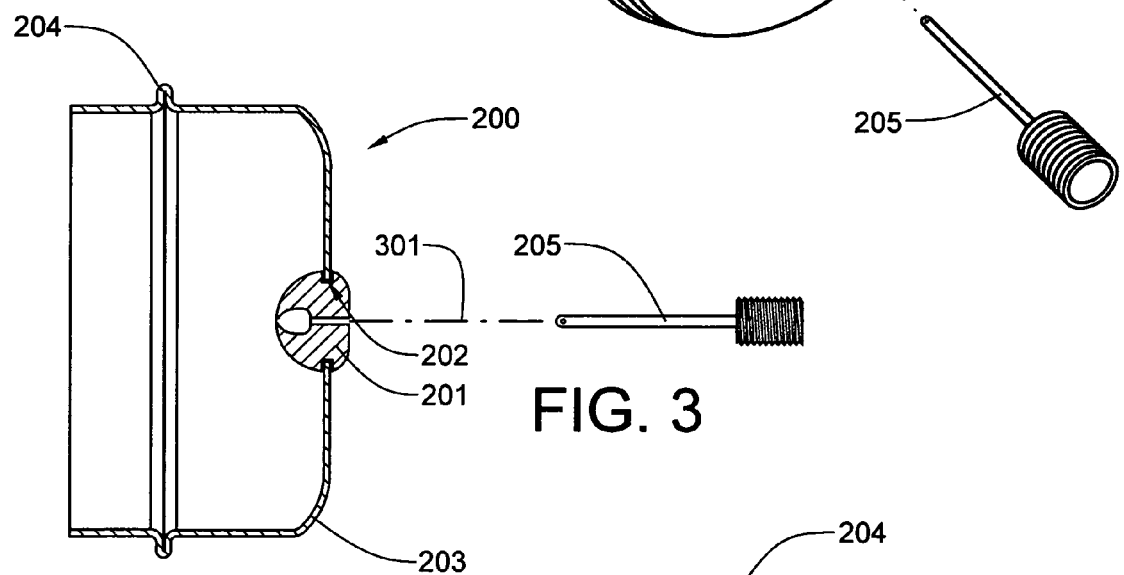
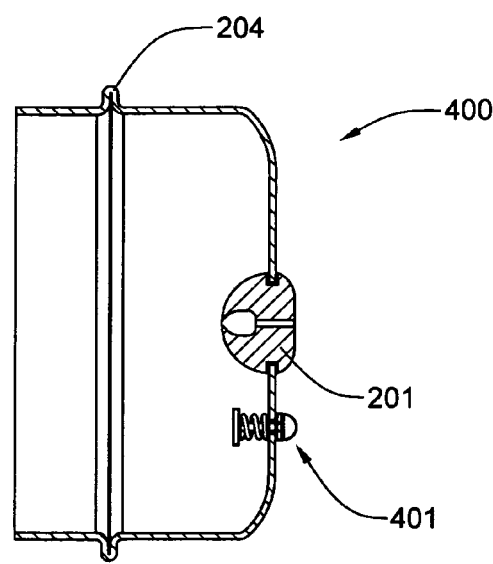

HUB CAP HAVING AN AIR VALVE FOR BEARING CAVITY PRESSURIZATION

This is a Continuation-in-Part of application Ser. No. 10/366,969, which was filed on Feb. 13, 2003 and which is now abandoned.

BACKGROUND OF THE INVENTION

1. Field of the Invention

This invention relates to hub caps for wheel hubs having tapered roller bearing races within a sealed cavity and, more particularly, to hub caps having an air valve through which the sealed cavity can be pressurized to prevent the inflow of water when the wheel hub is submerged in water, as when hubs on a boat trailer are submerged in the water during launching and recovery of the boat.

2. Description of the Prior Art

Referring now to FIG. 1, a conventional boat trailer wheel hub 100 typically has inner and outer tapered roller bearing assemblies 101A and 101B, respectively. Each bearing assembly has an inner race 102 that is mounted on the axle 103, an outer race 104 that is pressed into the hub body 105, and a plurality of tapered rollers 106 mounted in an annular roller retainer 107, which ride against both the inner and outer races. As the races and tapered rollers are fabricated from hardened steel, they are extremely vulnerable to corrosion. Wheel hubs typically have a cavity 108, which is spanned by the axle shaft between the inner and outer bearing assemblies, and open at both ends. The cavity is filled with a high-temperature grease (not shown) in sufficient quantity that the bearing races and rollers are continually bathed in liquified grease as centrifugal force throws the grease against the cavity walls. The grease is retained within the cavity 108 by a hub cap 109, that is pressed into the nose 110 of the hub body 105 and seals the outer opening, and by a flexible, neoprene rubber seal 111, that seals the inner opening. The neoprene rubber seal 111 is molded into a metal retainer ring 112 that is pressed into the inner opening of the hub. A flexible annular lip (not shown) on the neoprene rubber seal 111 rides against a cylindrical sealing surface on the axle shaft.

Though entirely adequate to protect the bearing assemblies from rain, the neoprene seal is unable to provide hermetic sealing when the hub assembly is submerged. Boat trailer wheel hubs are usually submerged in water during each launching and each recovery of the carried boat. Entry of water into the hub cavity occurs via the following mechanism. When the trailer is being towed, friction caused by a combination of continuing movement of the bearing assemblies, contact of the tires with the road and—if the trailer is so equipped—braking generates heat, which causes the air and grease inside the hub cavity to expand. When the hot hub is submerged in water during launching of the boat, the hub cools and the air and grease inside the hub cavity contract, thereby reducing the pressure within the hub cavity below ambient atmospheric pressure. The neoprene rubber seal, which seals most effectively when the pressure within the hub cavity is greater than ambient atmospheric pressure, actually functions as a one-way valve when the pressure gradient is reversed. Water, sand, and other contaminants flow into the hub cavity until the pressure within the hub is equal to the ambient atmospheric pressure. Once water has found its way into the hub cavity, destruction of the bearing assemblies and possibly the axle shaft via corrosion is inevitable.

The problem of bearing corrosion in boat trailer hubs has spawned a multitude of inventions aimed preventing water from entering into the hub cavitys of trailer wheels. Some of the preventative measures covered by these inventions are costly to implement, others are complex, others are costly, and some are ineffective. The following patents are exemplary of the prior art.

In U.S. Pat. No. 3,785,706, issued to Vangalis on Jan. 15, 1974, there is disclosed a pressurized hub cap for a vehicle wheel. The Vangalis patent describes a cup-shaped cap having a flange which seats on the wheel hub. A helical spring urges a piston in the direction of the axle of the trailer to hold grease on the outside of the axle and associated nut. A vent hole is provided on the outside of the piston, and a second hole is provided to allow the escape of grease in the event that excessive expansion of the grease occurs. A similar construction is described in U.S. Pat. No. 4,106,816, issued to August on Aug. 15, 1978. In U.S. Pat. No. 3,955,852, issued to De Puydt et al. on May 11, 1976, there is also described a trailer hubcap device utilizing a spring-biased piston to pressurize grease against the outside of the axle and nut. The De Puydt et al. patent further describes a manual actuator to permit the pressure to be relieved while the trailer is being moved along a roadway.

A related hubcap construction is described in U.S. Pat. No. 3,649,080, issued to Molinare on Mar. 14, 1972. This patent describes a hubcab construction which includes a grease fitting to permit introduction of grease into the cap and also a pressure relief valve to provide for expansion of the grease. In U.S. Pat. No. 3,393,015, issued to Kaufman of Jul. 16, 1968, there is described a hubcap which includes an O-ring normally positioned over a vent hole to prevent the entrance of water within the cap, but which will expand to uncover the hole for permitting air and grease to be vented from the hubcap when heated. A protective hubcap closure is described in U.S. Pat. No. 3,149,883, issued to Reilly on Sep. 22, 1964. The Reilly patent describes a hubcap which is flexible to become contracted or compressed when the trailer is immersed in cold water.

A different approach to the waterproofing for a hubcap is described in the Eberle patent, U.S. Pat. No. 3,226,162, issued on Dec. 28, 1965. The Eberle patent describes the use of a tube connecting from the pressurized tire to the hubcap, for permitting air to be vented into the hubcap as a method for pressurizing the cap to prevent entrance of water.

Several types of pressure relief hub caps have been produced in the past. One type is shown in U.S. Pat. No. 3,785,706 to Van Galis. In this device, a cup shaped seal is mounted within a cup shaped hub cap, with a spring acting on the seal to compress the grease within the hub. A first opening in the cap adjacent the outer end provides for pressure relief in the spring area between the seal and the outer end of the hub cap. A second opening in the hub cap inboard from the first opening provides for escape of grease when the pressure within the hub is sufficient to compress the spring.

Another type of hub cap is shown in U.S. Pat. No. 3,077,948 to Law. This structure utilizes a cup shaped seal sliding in a sleeve with a spring urging the seal inward to compress the grease. The sealing action occurs between the cup shaped seal and an O-ring in the inner surface of the sleeve. A grease fitting is carried in the sliding seal for introducing grease into the hub.

The hub cap of the U.S. Pat. No. 3,785,706 patent suffers from the disadvantage that grease can be added to the hub only by removing the hub cap. This problem is solved by the hub cap of the U.S. Pat. No. 3,077,948 patent. However there are still some disadvantages with this structure. When the hub is being filled with grease by a grease gun, the manual force utilized in holding the grease gun in place also acts to hold the sliding seal in fixed position so that excess pressure can be built up within the hub and the inner bearing seal can be damaged without the operator knowing of this fact. That is, the automatic pressure release operation is nullified by the force applied with the grease gun. Also, the cup shaped seal which slides within the outer sleeve or housing and engages the O-ring for making a seal provides only limited area for escape of grease.

One of the more popular devices for affording protection to the bearings of trailer wheels is covered by U.S. Pat. No. 4,106,816 to August. Known as the "Bearing Buddy", the device is a specially designed hub cap having a sliding piston with a centrally-positioned grease fitting. The piston is biased with a coil spring and is designed to maintain the bearing bathed in grease. One of the problems with this device is that it is impossible to remove all of the air from the cavity by injecting grease from the outer end of the hub, as the inward hub seal will prevent the escape of pressurized air that builds up as grease is injected into the bearing cavity. Because the trapped air and grease have different rates of expansion, it is difficult for the device to work as intended. Another problem is that the spring constantly pressurizes the bearing cavity of the wheel hub. This added pressure forces the wiping portion of the inner neoprene seal more firmly against the outer surface of the axle shaft. The added pressure increases the wear rate of the seal.

Accordingly, it is an object of the present invention to provide a new and improved hub cap that is both simple to use and inexpensive to manufacture, for sealing against the entrance of moisture into the bearing cavity. It is the intent of the present invention to prevent water and other contaminants from entering a boat trailer wheel hub by providing temporary pressurization of the wheel hub cavity at times when the boat trailer must be partially submerged during the launch and recovery of a boat.

SUMMARY OF THE INVENTION

The present invention provides a hub cap for wheel hubs that includes an air valve. The valve may take several different forms. A preferred embodiment hub cap employs a security air valve that is inserted through an aperture formed within the hub cap body. This type of valve was developed either during World War II or shortly thereafter and is used as an inflation valve in most modern athletic balls. Air can be pumped into the air valve using a needle inflator. An advantage of such a valve is that it is low profile and unlikely to be damaged by towing the trailer too close to stationary objects. The use of a valve in the hub cap allows the hub cavity to be temporarily pressurized when a boat trailer is partially submerged during the launch and recovery of a boat. It is intended that the hub cavity pre pressurized only during periods when the wheel hub is submerged, as traveling extended distances with the additional pressure will increase the temperature and wear of the neoprene seal that prevents the escape of grease between the hub and axle at the inner opening of the bearing cavity. Sufficient air pressure is added to the wheel bearing cavity so that it remains above the sum of ambient atmospheric pressure plus the added pressure caused by the depth of submersion, even when a hot hub assembly is submerged in water and the inner pressure is reduced as the hub cools to the temperature of the water.

One of the problems associated with pressurizing the hub cavity is the possibility that the hub cap will be blown off the hub. When hub caps are new, a near perfect interference fit exists between the nose of the wheel hub and the cap. Given the presence of grease, an air tight seal is provided. However, with age and repeated removals of the hub cap, the sealability decreases. Therefore, another aspect of the present invention is the provision of a retainer clip that can be installed over the hub cap and clip into grooves which are cut in the nose of the wheel hub. A boat trailer owner, exercising a reasonable amount of care, can cut the grooves in the wheel hub with a cut-off wheel on a hand grinder tool.

Another feature which reduces the potential for blowing off the hub cap or destroying a rubber seal when pumping air into the hub cavity is the provision of a spring-loaded pressure relief valve in the hub cap. The spring constant is selected so that any attempt to over-pressurize the hub cavity will result in the release of excess pressure.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof. In the drawings:

FIG. 2 is an isometric view of a valved hub cap, which has a security air valve installed therein for injecting air into the bearing and axle cavity of a wheel hub using a needle inflator;

FIG. 3 is a cross-sectional view of a valved hub cap, taken through the security valve axis and the axis of rotation of the hub cap;

FIG. 4 is an isometric view of an enhanced valved hub cap, which has coil spring loaded pressure relief valve installed therein;

DESCRIPTION OF THE PREFERRED EMBODIMENT

The various embodiments of the invention will now be described with reference to the accompanying drawing figures. It should be understood that the drawings are merely illustrative of the invention, are not intended to limit the scope thereof, and are not necessarily drawn to scale.

Figure 1:
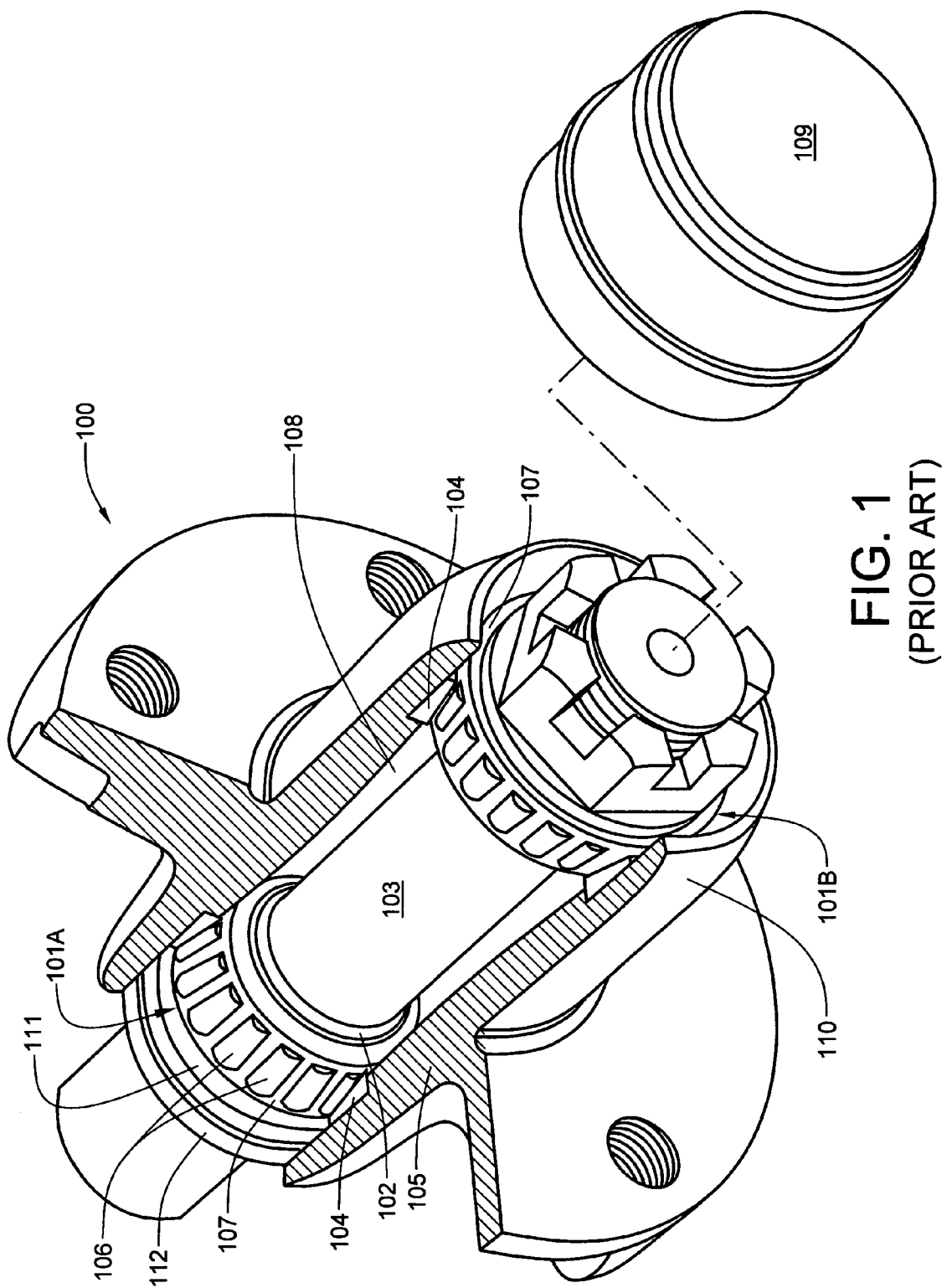
FIG. 1 is a cut-away perspective view of a trailer hub and axle assembly, complete with two sets of installed bearing assemblies and a conventional hub cap shown as ready for attachment thereto.

Referring now to FIG. 2, a hub cap 200 employs a security air valve 201 (commonly referred to as a needle valve) that is inserted through an aperture 202 formed within the hub cap body 203. An annular flange 204 limits the amount that the hub cap 200 may be inserted into the nose of the wheel hub. An needle inflator 205, identical to those used to inflate balls and other sports equipment, is shown positioned in an axial relationship with the hub cap. The cap is designed to replace a standard hub cap of the type shown in FIG. 1. An advantage of the security air valve 201 is that it has a low profile that minimizes the potential for damage caused by towing the trailer too close to stationary objects.

Referring now to the cross-sectional view of FIG. 3, the construction of the security air valve 201 is shown in greater detail. The security air valve 201, which is radially symmetrical about a needle insertion axis 301, is designed so that as air pressure is increased on the inside of the hub cap with respect to ambient air pressure on the outside of the hub cap, the valve seals more tightly.

Referring now to FIG. 4, a further modified hub cap 400 is similar to the hub cap of FIGS. 2 and 3, with the exception that it has been modified to include a pressure release valve 401, that is installed in the hub cap body 203. The pressure release valve limits maximum pressure when the hub cavity is pressurized so that the inner seal will not be damaged by excessive pressure. The maximum allowable pressure, that is determined by the spring constant of a spring incorporated into the pressure release valve 401, is deemed to be about 30 pounds/square inch.

Figure 5:
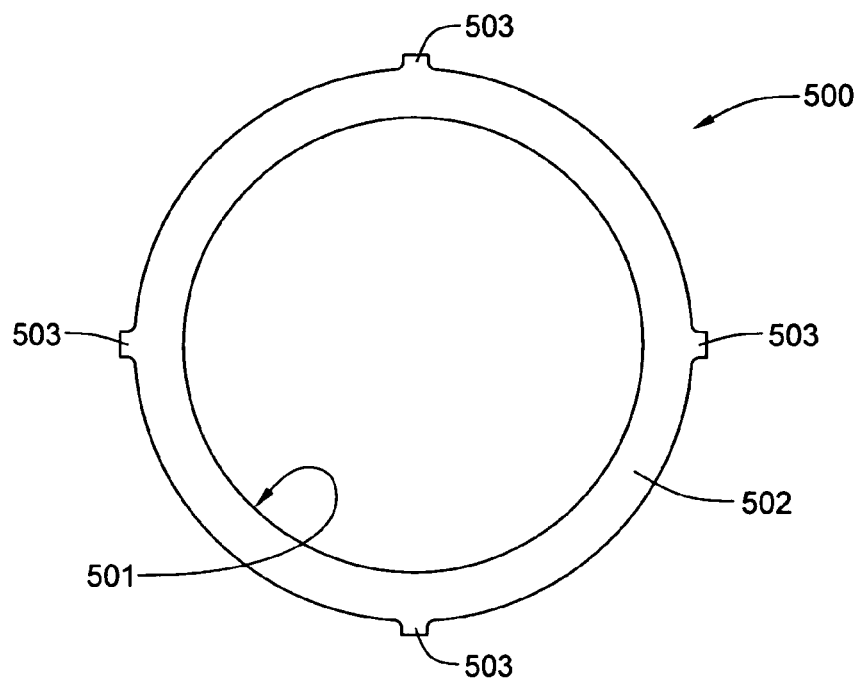
FIG. 5 is a top planar view of a hub cap retainer clip.
Figure 6:
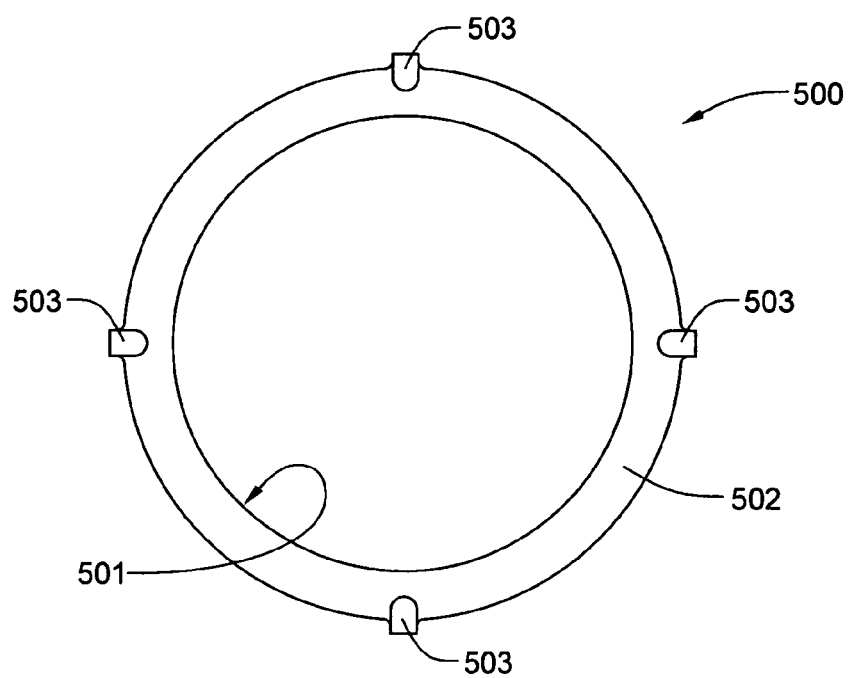
FIG. 6 is a bottom planar view of the hub cap retainer clip of FIG. 5.
Figure 7:
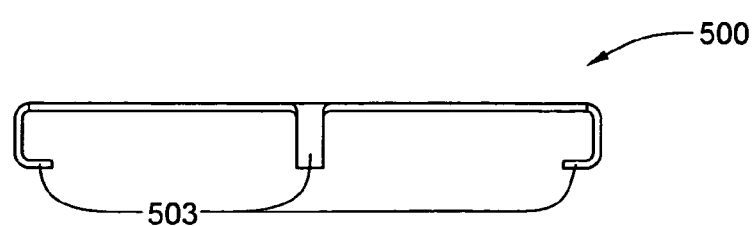
FIG. 7 is a side elevational view of the hub cap retainer clip of FIGS. 5 and 6.

Referring now to FIGS. 5 through 7, a spring retainer clip 500 has a central aperture 501 that is sized to fit over the outer end of a hub cap 200 or 400. The annular flange 204 is larger in diameter than the central aperture 501, thereby acting as a stop for the circular portion 502 of the retaining clip 500. The retainer clip 500 has multiple hooked projections 503 which extend from the circular portion 502, and are oriented toward the wheel hub 101. The nose 110 of the wheel hub 100 can be easily modified to receive each of the hooked projections 503. FIG. 12 shows the modifications required. Spring steel is deemed to be the preferred material from which the retainer clip 500 is fabricated.

Figure 8:
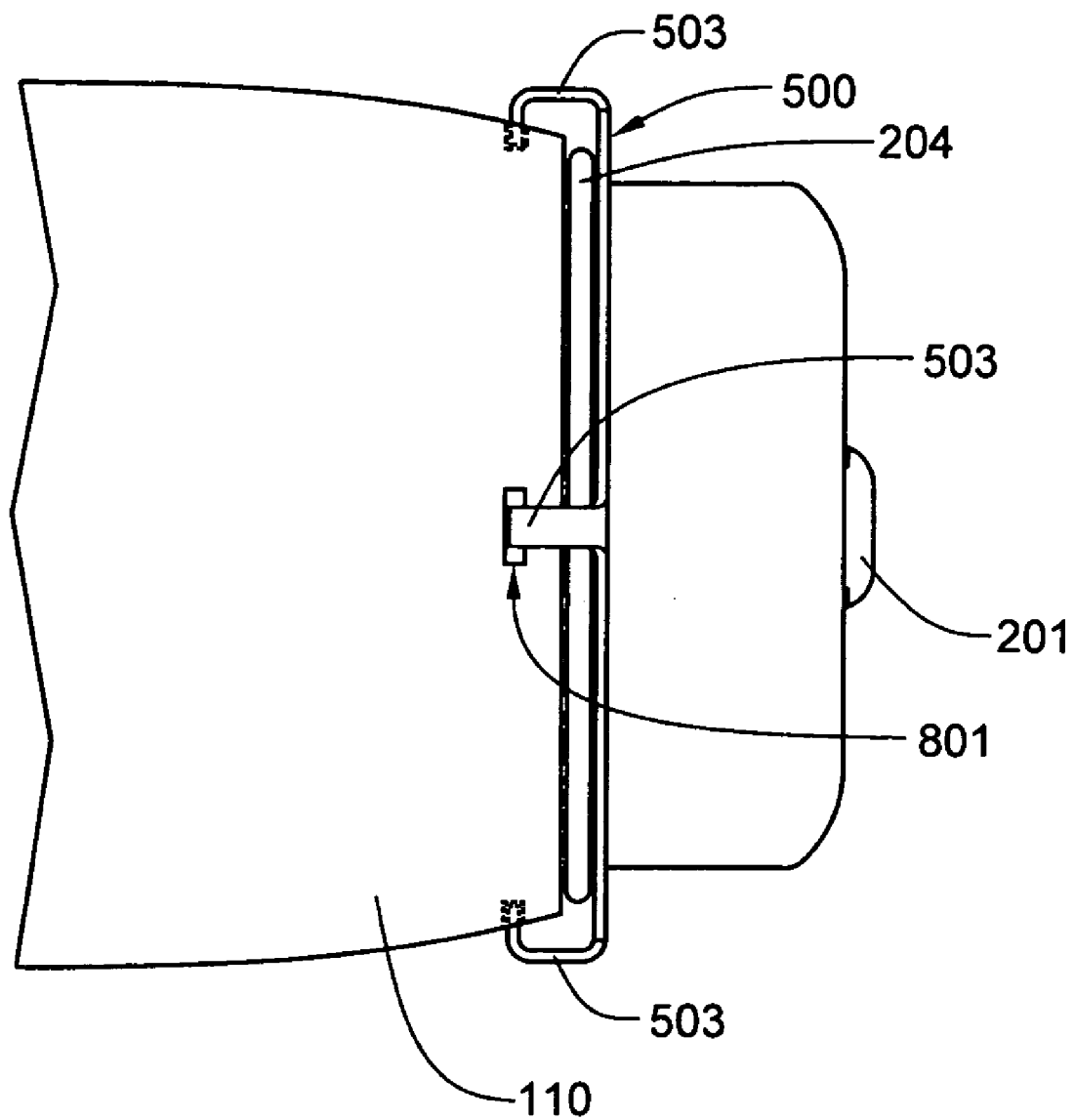
FIG. 8 is a side elevational view of the external portion of a wheel hub, modified in accordance with the present invention and having a first embodiment valved hub cap installed therein, that is secured to the wheel hub with the retainer clip of FIGS. 5, 6 and 7.

Referring now to FIG. 8, a retainer clip 500 is shown installed over a first embodiment valved hub cap 200 and clipped to the nose 110 of a hub body 105. Equiangularly-spaced grooves 801 have been cut in the nose to receive each of the hooked projections 503. Such grooves may be easily cut using a cut-off wheel mounted on a hand grinder, such as those manufactured and sold by Dremel, Inc. It will be noted that the annular portion 502 of the clip 500 rides the annular flange 204 of the hub cap. It should also be obvious that either a first or second embodiment valved hub cap (200 or 400, respectively) may be so attached to the nose 110 of the hub body 105.

The various embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

What is claimed is:

1. A hub cap for use on boat trailer wheel hubs having a sealed chamber containing a pair of roller bearing assemblies, said hub cap comprising:
   a hub cap body that is generally cylindrically-shaped and closed at an outer end thereof, said hub cap body having an aperture therein;
   a needle air valve secured within the aperture, said needle air valve including a circular orifice therein, said needle air valve being readily accessible when the hub cap is installed in a wheel hub, so that air may be pumped into the sealed chamber by insertion of a hollow needle into the orifice of said needle air valve; wherein as pressure increases within said sealed air chamber, said circular orifice of said needle air valve remains closed; and
   a spring-loaded pressure release valve for limiting a maximum amount of air pressure that may be injected into the sealed chamber.

2. The hub cap of claim 1, wherein said aperture is located in the closed outer end of the hub cap body.

3. A method for pressurizing the sealed chamber of a boat trailer wheel hub, said chamber containing a pair of roller bearing assemblies, the method comprising the steps of:
   providing a hub cap that incorporates both a needle air valve and a spring-loaded air pressure relief valve therein, said needle air valve including a circular orifice therein, wherein as pressure increases within said sealed air chamber, said circular orifice of said needle air valve remains closed; and said air pressure relief valve limiting a maximum amount of air pressure that may be injected into the sealed chamber;
   sealing an outer end of the wheel hub with said hub cap;
   pumping air into the sealed chamber through said needle air valves by insertion of a hollow needle into the orifice of said needle air valve.

\* \* \* \* \*